United States Patent

Cohrs et al.

[11] Patent Number: 5,930,751
[45] Date of Patent: Jul. 27, 1999

[54] METHOD OF IMPLICIT CONFIRMATION FOR AUTOMATIC SPEECH RECOGNITION

[75] Inventors: Paul Wesley Cohrs; John Arthur Karpicke; Donald Marion Keen; Barry L. Lively, all of Indianapolis, Ind.

[73] Assignee: Lucent Technologies Inc., Murray Hill, N.J.

[21] Appl. No.: 08/866,726

[22] Filed: May 30, 1997

[51] Int. Cl.⁶ .................................................. G10L 7/08
[52] U.S. Cl. ........................................ 704/231; 704/270
[58] Field of Search .................................. 704/270, 273, 704/275, 276, 231

[56] References Cited

U.S. PATENT DOCUMENTS

| | | | |
|---|---|---|---|
| 4,525,793 | 7/1985 | Stackhouse | 704/270 |
| 4,870,686 | 9/1989 | Gerson et al. | 704/275 |
| 4,945,570 | 7/1990 | Gerson et al. | 704/275 |
| 4,959,864 | 9/1990 | Van Nes et al. | 704/251 |

*Primary Examiner*—David R. Hudspeth
*Assistant Examiner*—Susan Wieland

[57] ABSTRACT

A method for automatically confirming verbal commands issued by a user and received by an automatic speech recognition system. Each verbal command is associated with a command operator set in which one or more command operators are stored. After the user vocalizes a recognized verbal command, the automatic speech recognition system awaits vocalization of a valid command operator from an associated stored command operator set for a pre-determined period of time. During this waiting period a non-intrusive indicator such as a light or a low volume tone notifies the user that the automatic speech recognition system is awaiting or ready to receive an appropriate command operator. If the user vocalizes a valid and recognized command operator during the waiting period, then the automatic speech recognition system executes the verbal command using the command operator and issues a confirmation to the user that the verbal command has been executed. Otherwise, the automatic speech recognition system returns to its idle state awaiting a further verbal command.

5 Claims, 1 Drawing Sheet

METHOD OF IMPLICIT CONFIRMATION FOR AUTOMATIC SPEECH RECOGNITION

BACKGROUND OF THE INVENTION

1. Field of the Invention

The present invention relates to automated speech recognition. More particularly, the invention is directed to a method for automatically confirming verbal commands issued by a user and received by an automatic speech recognition system.

2. Description of the Related Art

Two general categories of speech recognition systems are well known in the art. The first category includes speech recognition systems used for automating data acquisition ("speech data systems"). Speech data systems typically recognize speech by converting a sequential set of speech data segments vocalized by the user into a corresponding set of data elements. The data elements may then be transmitted to a secondary computer system for processing or storage. For example, many banks permit a customer calling a customer service telephone number to vocalize, for automated recognition by a speech recognition system, the customer's credit card number. Each numeral of the credit card number vocalized by the customer is a speech data segment which is recognized as a corresponding data element. The recognized credit card number is then used to retrieve information about the customer's account. Other speech data systems are used to recognize a user's speech and convert it into text, which may be stored in a secondary computer system for subsequent manipulation.

The second category of speech recognition systems includes systems used for interpreting and executing pre-defined verbal commands ("speech command systems"). A verbal command is typically a collection of speech data segments with an associated data processing instruction that is executable by a data processing system or another electronic device to perform a particular function. For example, an electronic clock equipped with a speech command system may have a predefined verbal command of "current time". When the user speaks the phrase "current time", the speech command system interprets the verbal command and executes a data processing instruction to inform the user of the current time. Typically, a speech command system will have several predefined verbal commands stored in a command set.

Speech command systems use similar recognition techniques to those of speech data systems; however, instead of treating and recording recognized speech data segments as pure data, a speech command system compares the set of recognized speech data segments to the verbal commands in the command set. If the recognized speech data segments match a speech data component of one of the stored verbal commands, then the speech command system executes the instruction associated with that command. Otherwise, the speech data system ignores recognized speech data segments that do not match any of the verbal commands.

Like all automatic speech recognition systems, speech command systems are subject to an error commonly known as false recognition. False recognition occurs when a speech command system incorrectly identifies a user's utterance as a particular verbal command. For example, if the user is speaking to another person while using the speech command system, one of the user's phrases may be incorrectly interpreted by the speech command system as a verbal command. In cases where a verbal command includes or activates an additional command operator, false recognition of verbal commands can have significant effects. For example, a telephone equipped with a speech command recognition system for placing calls will typically have a verbal command "call" that directs the telephone system to place a call and a command operator set of one or more names with associated telephone numbers to which the call is to be placed. Thus, to place a call to a person named Bill King using a speech recognition-equipped telephone, the user simply speaks "call Bill King" to thereby instruct the telephone to dial Bill King's telephone number. However, if the same user were to tell another person "You should call Bill King tomorrow" when the user is in close proximity to the telephone, then this speech may be incorrectly interpreted and acted upon as a verbal command to dial Bill King's telephone number, causing the user (and perhaps Bill King) inconvenience and unnecessary expense.

To address the problem of false recognition, prior art speech data systems have incorporated a required second or confirmation verbal command to confirm that a particular identified utterance by the user is in fact intended to be an actual verbal command. In the previous example, before dialing Bill King, the telephone equipment would prompt the user to confirm, by saying "yes" or "no", whether a call to Bill King should be made. While this approach provides a workable solution to the false recognition problem, it is flawed in two respects. First, if the user did in fact intend an actual verbal command to place a call, then the user is forced to go through an extra step of confirming the command even though the original command was correctly recognized. Moreover, when an utterance is falsely interpreted as a verbal command, the user's activity is unnecessarily interrupted by the speech command system request for confirmation of a verbal command that was never given.

SUMMARY OF THE INVENTION

A method for automatically confirming verbal commands issued by a user and recognized by a speech command system is provided. When a user issues a verbal command, the speech command system recognizes or identifies the command and retrieves a set of verbal command operators associated with the initial identified verbal command. The speech command system then initiates operation a timer of a pre-determined maximum timing period and activates an indicator to alert the user that the system is awaiting a verbal command operator. The indication is preferably performed without interrupting the user's activity. For example, the indication may be accomplished by a visual indicator (e.g., a light) and/or a low volume tone. If the user vocalizes a recognized verbal command operator from the retrieved verbal command operator set before the timer reaches its maximum timing period, then the speech command system executes the initial verbal command using the verbal command operator and issues a confirmation to the user that the command has been executed. If, on the other hand, the user does not vocalize an appropriate verbal command operator from the retrieved verbal command operator set before the timer reaches its maximum timing period, then the speech command system deactivates the indicator and returns to its idle state, ready to receive new verbal commands.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
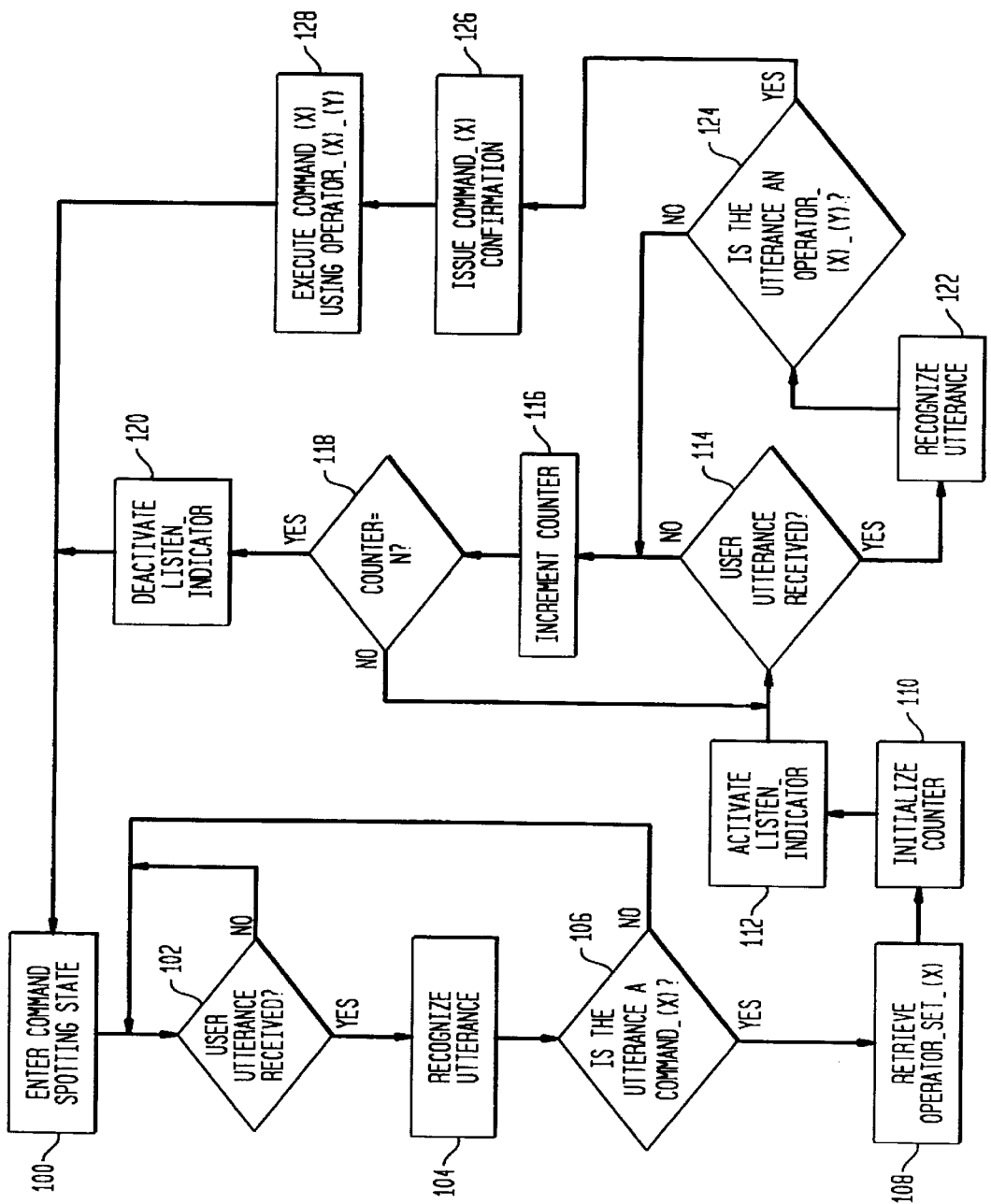
FIG. 1 is a flow chart depicting a mehtod for automatically confirming verbal commands issued by a user and recognized by a speech comand system implemented in accordance with the teachings of the present invention.

The present invention is broadly directed to a method for automatically confirming verbal commands issued by a user and recognized by a speech command system. The method of the invention is preferably implemented in a digital microprocessor-based speech recognition system ("speech command system") operatively capable of interpreting and executing verbal commands, and of storing verbal commands in a memory. It should be noted that "executing a verbal command" refers to the execution of a data-processing instruction or instructions associated with that verbal command. Preferably, each verbal command is pre-defined as a primary command "COMMAND_(X)" and a command operator "OPERATOR_(X)_(Y)" selected from a command operator set "OPERATOR_SET_(X)" associated with the COMMAND_(X). The variable "(X)" identifies a particular primary command and its associated command operator set. For example, a third primary command and its associated command operator set are identified as COMMAND_3 and OPERATOR_SET_3, respectively. The variable "(Y)" identifies a particular command operator stored in the OPERATOR_SET_(X). For example, a fourth command operator in the OPERATOR_SET_3 is identified as OPERATOR_3_4. Thus, in order to execute a verbal command, the user must first vocalize the primary command COMMAND_(X), and then vocalize command operator OPERATOR_(X)_(Y) selected by the user from the set OPERATOR_SET_(X). For example, COMMAND_1 for telephone equipped with a speech command system may be defined as "make a call". The OPERATOR_SET_1 would then include a list of names (e.g., Jeff Gold, Bill Smith, etc) each defined as OPERATOR_1_(1 . . . Y). To place a call to Bill Smith, the user would say "make a call" and then say "Bill Smith." The speech command system will then dial a telephone number associated with Bill Smith. If the user does not vocalize an OPERATOR_1_(Y) following COMMAND_1, then the speech command system does not execute COMMAND_1. Preferably the OPERATORs_(X)_(Y) are defined by the user. Thus, in the previous example, prior to operating the speech command system, the user would define each OPERATOR_1_(Y) as a name of a particular individual or institution to be dialed along with an associated telephone number. In addition, the user may also define one or more COMMANDs_(X). For example, a personal computer-based speech command system enables the user to define one or more COMMANDs_(X) to control various application programs.

In accordance with the method of the present invention, after the user vocalizes a COMMAND_(X), the speech command system awaits vocalization of a required OPERATOR_(X)_(Y) for a pre-determined period of time. During this waiting period a non-intrusive indicator such as a light, a low volume tone, or a character-based display notifies the user that the speech command system is ready to receive a command operator OPERATOR_(X)_(Y). If the user vocalizes an OPERATOR_(X)_(Y) during the waiting period, then the speech command system executes the primary command COMMAND_(X) using the command operator OPERATOR_(X)_(Y) and issues a confirmation to the user that COMMAND_(X) has been executed. Otherwise, the speech command system returns to its idle state awaiting further verbal commands.

Referring now to the drawing Figure, the inventive method begins at block 100 where the speech command system enters and remains in its idle or "command spotting" state, ready to receive verbal commands. By way of example, a user may manually turn on a speech command system feature on a telephone set, or the speech command system may activate automatically when the user is in close physical proximity to the telephone. The method flow then proceeds to block 102 where the speech command system waits until the user speaks. When an utterance is then received from the user, flow proceeds to block 104 where the speech command system recognizes or identifies the utterance. An utterance is preferably a word or phrase spoken by the user in proximity to the speech command system. Recognition or identification of the particular utterance may be carried out by the speech command system using any available or well-known speech recognition techniques. At block 106, the speech command system determines whether the recognized utterance is a known COMMAND_(X). If so, then flow proceeds to block 108; otherwise, flow returns to block 102 where the speech command system continues to wait for further speech from the user. When a COMMAND_(X) is recognized, the speech command system identifies a corresponding data processing instruction to perform a particular task. For example, if the COMMAND_1 is "make a call", then the speech command system will recognize that verbal command as an instruction to dial a particular telephone number yet to be identified.

At block 108, the speech command system retrieves a stored OPERATOR_SET_(X) that is associated with the COMMAND_(X) recognized at block 104. The OPERATOR_SET_(X) includes one or more OPERATORs_(X)_(Y) for use with the COMMAND_(X). For example, if the COMMAND_(X) was "make a call", the OPERATORs_(X)_(Y) may include names of people or institutions defined by the user and to which calls are to be made.

At block 110, the speech command system next initializes a COUNTER variable, which is preferably implemented as a timer of a predefined maximum timing period "N". The time period "N" is preferably of at least sufficient duration for the user to vocalize an operator command OPERATOR_(X)_(Y). At block 112, the speech command system activates a LISTENING_INDICATOR to inform the user that the speech command system is waiting for the user to vocalize an appropriate command OPERATOR_(X)_(Y). Preferably, the LISTENING_INDICATOR is non-intrusive so that the user's activity is not interrupted. Examples of non-intrusive LISTENING_INDICATORs include, without limitation, visual indicators such as an LED light or character-based display, audible indicators such as a low volume tone, and a combination of visual and audible indicators.

At block 114, the speech command system then waits for the user to vocalize an appropriate OPERATOR_(X)_(Y). If an utterance from the user is not received in a pre-determined timing interval (e.g., 1 millisecond), the flow proceeds to block 116 at which the COUNTER variable is incremented. The magnitude of the timing interval is dependent on the resolution of the timer used for implementing the COUNTER variable and may be determined as a matter of design choice. For example, a high resolution timer typically has a low interval, such as 1 microsecond. At block 118, the speech command system determines whether the COUNTER variable is equal to "N", i.e. whether the timer has reached the end of the predefined maximum timing period (i.e. timed out). If the COUNTER variable is not equal to "N", then the flow returns to block 114 where the speech command system continues to wait for the user to vocalize an OPERATOR_(X)_(Y). If, at block 118, the COUNTER variable is determined to be equal to "N", then the flow first proceeds to block 120 where the LISTENING_INDICATOR is deactivated, and next proceeds to block 100 at which the speech command system reenters the primary command-spotting state.

If an utterance is, on the other hand, received before the COUNTER variable reaches "N", then the flow proceeds from block 114 to block 122 where the speech command system recognizes or identifies the utterance. At block 124, the speech command system determines whether the recognized utterance is a known OPERATOR_(X)_(Y). If so, then flow proceeds to block 126; otherwise, flow proceeds to block 116 where the COUNTER is incremented.

At block 126, the speech command system issues a confirmation to the user that it is about to execute COMMAND_(X) using OPERATOR_(X)_(Y) recognized at block 122. For example, if the COMMAND_(X) is "make a call" and the OPERATOR_(X)_(Y) is "Bill King", at block 126 the speech command system would inform the user (e.g. via speech synthesis, a character based visual indicator, or a similar technique) that Bill King's number is about to be dialed. It should be noted, however, that the confirmation step represented by the confirmation block 126 may optionally be eliminated without departing from the spirit of the present invention, particularly if the speech command system with which the present invention is implemented lacks speech synthesis or character-based data output capability. At block 128, the speech command system executes the primary command COMMAND_(X) using the OPERATOR_(X)_(Y). Thus, if the speech command system is instructed to place a call as in the previous example, the system will dial the appropriate telephone number at block 128. Flow then returns to block 100 where the speech command system returns to the idle or command-spotting state.

While there have shown and described and pointed out fundamental novel features of the invention as applied to a preferred embodiment thereof, it will be understood that various omissions and substitutions and changes in the form and details of the herein-disclosed method, and in its operation, may be made by those skilled in the art without departing from the spirit of the invention. For example, it is expressly intended that all combinations of those method steps which perform substantially the same function in substantially the same way to achieve the same results are within the scope of the invention. It is the intention, therefore, to be limited only as indicated by the scope of the claims appended hereto.

What is claimed is:

1. A method of determining, in an automated speech recognition apparatus for identifying in user speech using a speech recognition technique and for executing, as a data processing instruction, a user-issued verbal command using a user-selected one of a plurality of associated command operators defining a command operators set and stored in a memory, whether to execute the verbal command which has been identified by the recognition apparatus in the user speech, comprising the steps of:

(A) identifying, in the speech recognition apparatus, a verbal command in user speech as a user-issued verbal command to the speech recognition apparatus;

(B) upon said identifying of the verbal command, starting a timer defining a predetermined time-out period and issuing, substantially concurrent with said starting of the timer, a user-perceptible indication that the speech recognition apparatus is awaiting receipt of a user-issued command operator associated with the identified verbal command;

(C) retrieving from the memory the command operators set associated with the identified verbal command;

(D) monitoring, in the speech recognition apparatus during the time-out period of the timer, user speech to identify in the user speech one of the command operators of the retrieved command operator set in the user speech during the time-out period, and (i) where one of the associated command operators is identified by the speech recognition apparatus in the user speech during the time-out period of the timer, executing as a data processing instruction the identified user-issued verbal command using the one of the associated command operators identified in the speech recognition apparatus, and (ii) where none of the plural command operators in the retrieved command operators set is identified by the speech recognition apparatus in the user speech during the time-out period, resetting the speech recognition apparatus at the end of the time-out period to await receipt and identification by the speech recognition apparatus of a subsequent user-issued verbal command.

2. A method of determining, in an automated speech recognition apparatus for identifying in user speech using a speech recognition technique and for executing, as a data processing instruction, a user-issued verbal command using a user-selected one of a plurality of associated command operators defining a command operators set and stored in a memory, whether to execute the verbal command which has been identified by the recognition apparatus in the user speech, comprising the steps of:

(A) identifying, in the speech recognition apparatus, a verbal command in user speech as a user-issued verbal command to the speech recognition apparatus;

(B) upon said identifying of the verbal command, starting a timer defining a predetermined time-out period and issuing, substantially concurrent with said starting of the timer, a user-perceptible indication that the speech recognition apparatus is awaiting receipt of a user-issued command operator associated with the identified verbal command;

(C) monitoring, in the speech recognition apparatus during the time-out period of the timer, user speech to identify in the user speech during the time-out period one of the command operators of the stored command operator set associated with the identified verbal command, and (i) where one of the associated command operators is identified by the speech recognition apparatus in the user speech during the time-out period of the timer, executing as a data processing instruction the identified user-issued verbal command using the one of the associated command operators identified in the speech recognition apparatus, and (ii) where none of the plural command operators in the retrieved command operators set is identified by the speech recognition apparatus in the user speech during the time-out period, resetting the speech recognition apparatus at the end of the time-out period to thereafter await receipt and identification by the speech recognition apparatus of a subsequent user-issued verbal command.

3. A method for automated confirmation of predetermined verbal commands issued by a user and received by an automated speech recognition apparatus having a memory and operable to apply a speech recognition technique and to execute data processing instructions, each verbal command having an associated operator set stored in the memory, wherein each verbal command comprises a command segment and an operator segment selected from the associated operator set, and wherein each verbal command defines to a data-processing instruction, said method comprising the steps of:

(a) waiting, by the apparatus, to receive a user vocalized first utterance;

(b) receiving, in the apparatus the user vocalized first utterance;

(c) applying, in the apparatus the speech recognition technique to the first utterance to identify in the first utterance a command segment;

(d) retrieving the command set associated with the identified command segment from the memory of the apparatus when the first utterance is a command segment, and returning to said step (a) otherwise;

(e) after said retrieving of the command set initializing, by the apparatus, a timer having a timing value of a predetermined maximum duration and activating, substantially concurrent with said initialization of the timer, an indicator to inform the user that the apparatus is ready to receive a user vocalized operator segment;

(f) determining, by the apparatus following said initialization of the timer, whether the apparatus has received a user vocalized second utterance during a predetermined timing interval less than said predetermined maximum duration, and:

(1) when a vocalized second utterance has been received by the apparatus, applying, in the apparatus the speech recognition technique to the second utterance to identify an operator segment in the second utterance vocalized by the user during the timing interval;

(2) incrementing the timing value of the timer by the timing interval when an operator segment is not received during the timing interval; and (3) comparing the timing value to the maximum duration and returning to said step (a) when the timing value is at least equal to the maximum duration and returning to said step (e) when the timing value is less than the maximum duration;

(g) analyzing the received vocalized command segment and the operator segment to identify the data processing instruction corresponding to the received vocalized command segment; and (h) executing the data-processing instruction defined by the command segment and the operator segment.

4. The method of claim 3 further comprising the steps of:

(i) before said step (h), issuing a confirmation to the user that the apparatus is ready to execute a data-processing instruction defined by the command segment and the operator segment.

5. The method of claim 3 wherein said indicator comprises at least one of an audio tone generator, a visual indicator, and a character-based display.

* * * * *